[112.]

LEWIS CUTTING.

Improvement in Furnaces for Soldering.

No. 4,565. Reissued Sep. 19, 1871.

Witnesses.
Benja Robinson
John Haley

Inventor
Lewis Cutting
by his atty
Thos. Wm. Clarke

AM. PHOTO-LITHOGRAPHIC CO. N.Y. (OSBORNE'S PROCESS.)

UNITED STATES PATENT OFFICE.

LEWIS CUTTING, OF SAN FRANCISCO, CALIFORNIA, ASSIGNOR TO FRANCIS CUTTING, OF SAME PLACE.

IMPROVEMENT IN FURNACES FOR SOLDERING.

Specification forming part of Letters Patent No. 71,141, dated November 19, 1867; reissue No. 4,565, dated September 19, 1871.

*To all whom it may concern:*

Be it known that I, LEWIS CUTTING, of San Francisco, county of San Francisco, State of California, have invented certain new and useful Improvements in Furnaces for Soldering Tin Cans; and I do hereby declare the following description and accompanying drawing are sufficient to enable any person skilled in the art or science to which it most nearly appertains to make and use my said invention or improvements without further invention or experiment.

Two soldering-furnaces heretofore invented have been used for soldering the ends of tin cans: Stevenson's, patented October 21, 1854, employed a hollow tube passing through the fire for the purpose of melting the solder by resting the bead upon the edge of the end plate on the walls of the tube, while the air-space kept the interior or central part of the end comparatively cool. Hollingsworth's, patented September 12, 1865, employed a hollow iron top, packed with coal-ashes as a non-conductor, to diminish radiation from the furnace-top. This invention is a great improvement on both of these.

The nature of my invention consists: First, in providing a non-conducting top, not iron jacketed, to a can-soldering furnace, and combining therewith conducting heaters exposed, as to their lower surface, to the fire-heat, and presenting upward a ring of hot conducting material on which to deposit the articles under treatment. Second, in making the heaters detachable from the top plate. Third, in packing the central upper portion of the heaters with non-conducting material. Fourth, in providing the heaters with a large mass of heated conducting material exposed to the fire-heat to secure uniformity of surface-temperature while at work. Fifth, in providing the fire-surface of the heaters with plates, so as to increase the fire area. The heat of the fire is thus concentrated upon the rims to be soldered; the large fire-surface exposed by the heaters, by slots, I I, or even by deep heaters, more thoroughly exhausts the heat of the fire, thus making an economy in coal or other fuel.

To more fully illustrate and describe my furnace, reference is had to the accompanying drawing forming a part of this specification, of which—

Figure 1:
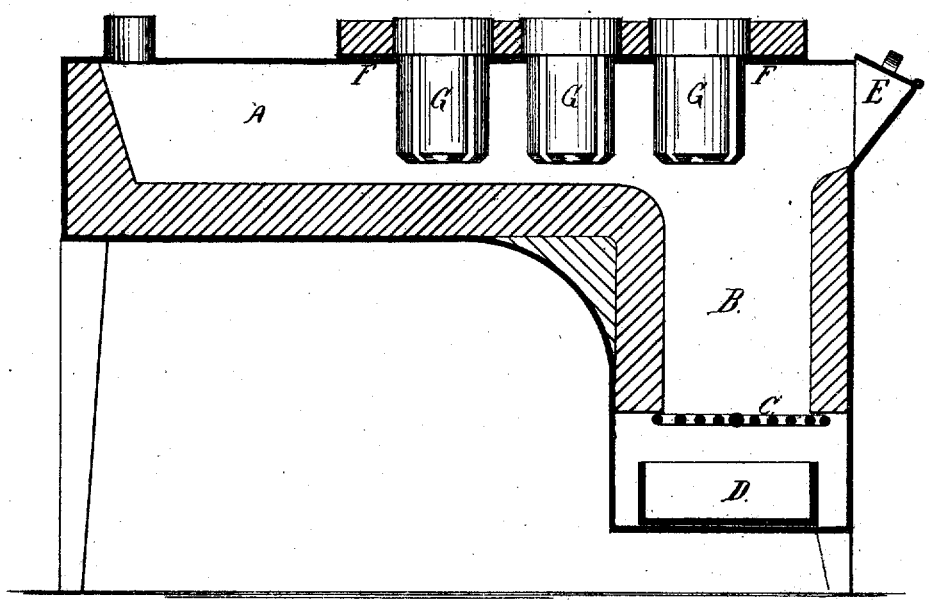
Figure 2:
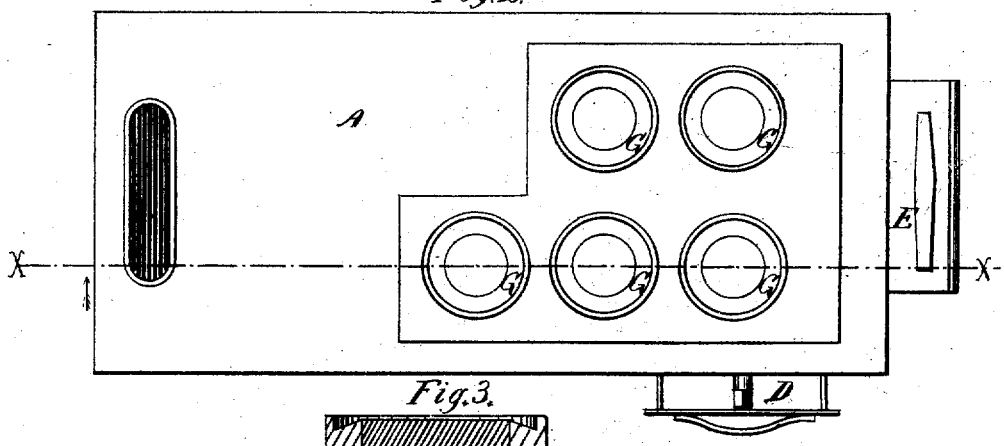
Figure 3:
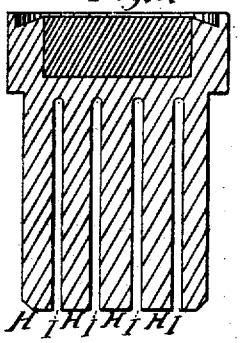

Figure 1 is a side-sectional elevation taken through the line *x x* of Fig. 2. Fig. 2 is a plan or top view; Fig. 3, a sectional elevation of heater.

A represents my furnace, made rectangular in form, a portion being cut away underneath. I consider this the best form for a furnace for the workmen, and more cans can be placed upon it than upon a round or oval one. In the front are placed the fire-box B and grate C, with ash-box D underneath. For convenience in feeding, an inclined opening, E, is made in the front end, which may be covered. I line the interior of the furnace with fire-brick or other refractory material. The top of the furnace is covered with plate F, which I prefer to make, as shown, as an uncovered iron pan, in order to fill it with plaster or other non-conducting material. It may, however, be formed of a slab of soap-stone or fire-brick or other refractory mineral, provided with apertures, through which the heaters, hereafter to be described, are exposed to the naked flames of the fire-chamber or hot-flue. This plate may be adjusted to the top of the furnace in any suitable manner, either permanently or so as to be removable. Heaters G G are then arranged in connection with said plate F, so as to elevate a ring of metal or other good conductor of heat for a short distance above the lower surface of plate F, said heaters being fully exposed below the plate to the action of the fire or flames. This may be done by making a block of cast or malleable iron of the vertical section shown in Fig. 3 for the heater, and passing it through the plate, through a hole made for that purpose, into the fire-chamber or hot-flue of the furnace. These heaters are hollow for nearly the depth of their projection above the lower surface of the plate F. Near the top of the heater shown in Fig. 3 is a ledge surrounded by a flange, upon which the end of the can rests in soldering. This flange is not absolutely essential, as the upper surface of the ledge may be a little below the surface of the covering or clothing of the plate F, about to be described; or, the can to be soldered may be allowed to rest on a flat surface of conducting material, communicating, through good conducting material, with the fire-chamber or hot-flue. The center of the upper part of the heater, hollowed as shown in Fig. 3, is filled with non-conducting material. By extending the heaters downward into the fire-chamber or hot-flue, as shown in Fig. 1, a large mass of hot iron is provided, absorbing heat by a large surface, retaining it by a large mass, and parting with it mainly through the small surface of the ledge upon which the edge of the can rests, and thus the heat is made more intense and uniform and the work can be conducted more rapidly than if the mass of iron in the heater were comparatively small with reference to the mass of metal in the cans to be operated upon. But it is obvious that the difference produced by having the heaters large and deep is one of degree only, and that the same kind of effect will be produced by heaters which do not extend below the plate F, and which fully expose to the hot gases of the fire-chamber or hot-flue a surface of conducting material as large as or considerably larger than the area of the ledge, and in full conducting communication with the ledge on which the cans rest. To furnish greater absorbing surface to the heated gases of the fire-chamber or hot-flue the lower part of the heaters G shown is divided vertically into plates H H by transverse slots I I. That part of plate F not covered or occupied by the heaters is composed of non-conducting material, or covered or clad by a non-conducting jacket of refractory material. Gypsum or plaster of Paris is a good material for this purpose, and many other substances, slow conductors, and not easily yielding to the action of heat at soldering temperatures, may be used, fixed in relation to the plate F in any suitable way.

Cans are soldered in this apparatus by placing a coil or ring of solder in proximity to the rim and plate to be united in the usual way and allowing it to melt and fill the joint. Any skilled sheet-metal worker can readily accomplish it, and one unskilled in soldering can learn in a few minutes.

The vital difference between this arrangement of the top of the furnace and that shown by Hollingsworth's patent is, that while in his the direct communication between the upper and lower surfaces of the top plate is cut off by non-conducting filling, yet the cover of the box containing the packing, being in full metallic communication through the sides with the bottom of the box, attains a much higher temperature than the non-conducting material with which it is packed and radiates heat of greater intensity; while in my furnace, the top being composed of non-conducting material, radiates from its refractory surface heat of lower intensity, and thus renders the temperature of the soldering-room less severe. This is an important improvement on the Hollingsworth furnace, and renders this method of soldering far more practical. The consumption of coal in this furnace is less, also, than in the Hollingsworth, as the heat is more effectually retained in it.

I claim as my invention, and desire to secure by Letters Patent—

1. The arrangement, with the top F, formed of gypsum, fire-brick, or other slow conductor of heat, of heaters G of good conducting material, whose lower surfaces communicate with and are exposed to the heated gases of the fire-chamber or hot-flue, substantially as described.

2. The organization into a soldering-furnace of the following elements: a top of non-conducting mineral matter whose radiating surface is not in good conducting communication with its absorbing surface, one or more heaters whose upper or delivering surface is relatively small to its lower or absorbing surface, a fire-chamber or hot-flue formed immediately below said non-conducting top and conducting heaters, along which the gases of combustion play in contact with said heaters, and a non-conducting center to the heaters, all arranged and combined substantially as described.

3. The heaters G, extending a considerable mass of conducting material into the fire-chamber or hot-flue of a soldering-furnace, substantially as described.

4. The heaters G, having their upper central surface packed with gypsum, fire-brick, or other slow conductor, substantially as described.

5. The said heaters G when provided with plates H, substantially as described.

LEWIS CUTTING.

Witnesses:
SIDNEY M. SMITH,
S. T. FRENCH.

(112.)